Patented Oct. 4, 1932

1,880,300

UNITED STATES PATENT OFFICE

WILLIAM P. ter HORST, OF NITRO, WEST VIRGINIA, ASSIGNOR TO THE RUBBER SERVICE LABORATORIES CO., OF AKRON, OHIO, A CORPORATION OF OHIO REACTION PRODUCT OF AN AMINE SALT OF AN ALKYL-DITHIO-CARBONIC ACID WITH BENZOTHIAZYL CHLOROTHIOCARBONATE AND PROCESS OF PRODUCING THE SAME No Drawing. Original application filed August 4, 1927, Serial No. 210,712. Divided and this application filed June 23, 1928. Serial No. 287,897.

The present invention relates to the manufacture of vulcanization accelerators comprising particularly those compounds obtained by combining the carbon disulfid derivatives of primary and secondary amines with the products obtained by reacting a mercaptothiazole and a chlorine derivative of carbon disulfid, sulfur or sulfur dioxide. The manufacture of the preferred class of accelerating compounds will be readily understood from the following description and examples.

Certain mercapto-aryl-thiazole compounds, such as mercapto-benzo-thiazole, and metallic salts thereof, and its disulfid, heretofore have been described as providing a class of vulcanization accelerators capable of imparting certain desirable properties to a rubber mix and furthermore capable of producing such a product in a relatively short vulcanization period. It has now been found that a rubber product possessing greatly enhanced properties results after an equally short vulcanization period by replacing mercapto-benzo-thiazole or its known derivatives with certain reaction products thereof of a type hereinafter set forth.

The amine salts of alkyl-dithiocarbamic acids, as are well known, are produced by the action of carbon disulfid on primary and secondary aliphatic amines. It has now been found that such salts can be combined with the products obtained by reacting mercapto-thiazoles with the chlorine derivatives of carbon disulfid, of sulfur or of sulfur dioxide to produce stable compounds. Such compounds have been found to be active as accelerators of vulcanization when employed in a rubber mix and produce rubber products in a short period of time that possess high tensile strengths and other highly desirable characteristics advantageous in commercial products.

The mercapto thiazole products employed in the manner hereinafter set forth for the manufacture of the products desired are obtained preferably by reacting a metallic salt of a mercapto aryl thiazole with a chlorine derivative of carbon disulfid, sulfur or sulfur dioxide. In the case of sodium mercapto- benzo-thiazole and thiophosgene, the reaction most probably takes place in the following manner:

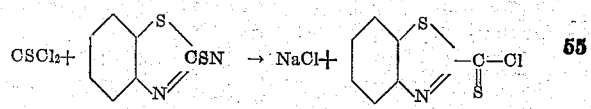

Such a product may be designated as benzo thiazyl chlorthiocarbonate. This reaction product and other similar products have been combined with dithiocarbamates in the manner set forth in the examples hereinafter described in detail to produce reaction products of the type and for the purpose desired.

The compounds of the type comprising the subject-matter of the present invention are preferably manufactured according to the following example, although other modes of reacting the ingredients set forth, as well as other analogous substances, may be employed. Substantially equal weights of piperidine-pentamethylene-dithiocarbamate having the formula of

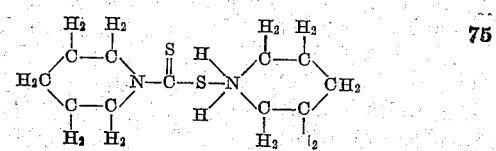

and of a reaction product of substantially equimolecular proportions of thiophosgene and sodium mercapto-benzo-thiazole having the probable formula of

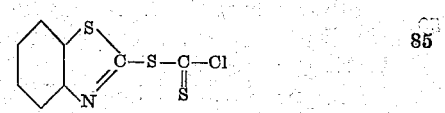

were added to a quantity of hot benzol or other suitable solvent material, preferably anhydrous, and the mass maintained at a temperature of approximately 60 to 70° C. for a period of time sufficient to permit the reaction to be completed. From four to six hours heating were sufficient for the temperature conditions given, but a longer or shorter period is necessary at lower or higher temperatures respectively. Thiophosgene and other analogous reaction products of mercapto compounds, manufactured by the reaction of other than equi-molecular proportions of the respective compounds have been reacted in a like manner with carbon disulfid derivatives of the amines.

As the reaction hereinbefore described proceeds, piperidine hydrochloride precipitates out while the reaction product desired remains in solution in the solvent employed. In order to permit all the piperidine hydrochloride to precipitate, it was found desirable, after the reaction had been completed, to allow the mass to cool down and stand undisturbed for some time. Thereupon the mass was filtered and the filtrate, containing the desired reaction product, was evaporated nearly to dryness. The remaining portion of solvent was then removed, preferably by vacuum drying. The residual brown mass comprising the product desired, is soluble in chloroform and other solvents.

The reaction product described has also been obtained by agitating and heating together the amine salt of an alkyl-dithiocarbamic acid with a substantially equal weight or other proportion of the thiophosgene reaction product of sodium mercapto-benzothiazole. Other similarly constituted products can likewise be prepared. Thus, the carbon disulfid reaction product of ethylamine, diethylamine, propylamine, butylamine having the formulae respectively of

and other aliphatic primary and secondary amines can be used in place of piperidine mentioned in the example set forth. These carbon disulfid derivatives of the amines can also be combined in other than equal proportions by weight with the thiophosgene, the per-chlor-methyl-mercaptan ($CSCl_4$), the sulfur chloride and other chlor sulfur compounds, as well as with the methylene-chloride, and like reaction products of mercapto-benzo-thiazole, its metallic salts, particularly its sodium salt, and of similar derivatives of other mercapto-aryl-thiazole, thiophenol and di-mercaptans such as the mercapto derivatives of penthiophene.

This case is a division of U. S. Patent No. 1,682,728, issued August 28, 1928.

What is claimed is:

1. The process of preparing a mercapto thiazole derivative comprising treating the amine salt of an alkyl-dithiocarbamic acid with benzo thiazyl chlorthiocarbonate.

2. The process of preparing a mercapto thiazole derivative comprising treating the piperidine salt of an alkyl-dithiocarbamic acid with benzo thiazyl chlorthiocarbonate.

3. The process of preparing a mercapto thiazole derivative comprising treating piperidine-pentamethylene-di-thiocarbamate with benzo thiazyl chlorthiocarbonate.

4. The process of preparing a mercapto thiazole derivative comprising the reaction between substantially equal weights of piperidine-pentamethylene-dithiocarbamate and of benzo thiazyl chlorthiocarbonate.

5. As a new product the mercapto thiazole derivative prepared by treating the amine salt of an alkyl-dithiocarbamic acid with benzo thiazyl chlorthiocarbonate.

6. As a new product the mercapto thiazole derivative prepared by treating the piperidine salt of an alkyl-dithiocarbamic acid with benzo thiazyl chlorthiocarbonate.

7. As a new product the mercapto thiazole derivative prepared by treating piperidine-pentamethylene-dithiocarbamate with benzo thiazyl chlorthiocarbonate.

8. As a new product the mercapto thiazole derivative prepared by the reaction between substantially equal weights of piperidine-pentamethylene-dithiocarbamate and of benzo thiazyl chlorthiocarbonate.

In testimony whereof I hereunto affix my signature.

WILLIAM P. TER HORST.